(12) United States Patent
Vinyals et al.

(10) Patent No.: US 11,227,206 B1
(45) Date of Patent: *Jan. 18, 2022

(54) GENERATING OUTPUT SEQUENCES FROM INPUT SEQUENCES USING NEURAL NETWORKS

(71) Applicant: Google LLC, Mountain View, CA (US)

(72) Inventors: Oriol Vinyals, London (GB); Navdeep Jaitly, Mountain View, CA (US)

(73) Assignee: Google LLC, Mountain View, CA (US)

( * ) Notice: Subject to any disclaimer, the term of this patent is extended or adjusted under 35 U.S.C. 154(b) by 211 days.

This patent is subject to a terminal disclaimer.

(21) Appl. No.: 16/552,495

(22) Filed: Aug. 27, 2019

Related U.S. Application Data

(63) Continuation of application No. 15/076,426, filed on Mar. 21, 2016, now Pat. No. 10,402,719.

(51) Int. Cl.
*G06N 3/04* (2006.01)

(52) U.S. Cl.
CPC ..................... *G06N 3/04* (2013.01)

(58) Field of Classification Search
CPC ........ G06N 3/08; G06N 20/00; G06N 3/0454; G06N 3/0427; G06K 9/6269
USPC .......................................................... 706/16
See application file for complete search history.

(56) References Cited

U.S. PATENT DOCUMENTS

| | | | | |
|---|---|---|---|---|
| 6,961,719 B1* | 11/2005 | Rai | ..................... | G06N 3/0454 706/21 |
| 7,376,633 B2* | 5/2008 | Ouimet | .................. | G06Q 10/00 700/28 |
| 7,454,321 B1* | 11/2008 | Rai | ..................... | G06N 3/0454 703/7 |
| 7,467,117 B2* | 12/2008 | Kermani | ................ | G16B 40/00 706/20 |
| 9,799,327 B1 | 10/2017 | Chan et al. | | |
| 10,013,653 B2* | 7/2018 | Bronstein | ................ | G06K 9/00 |

(Continued)

OTHER PUBLICATIONS

Cho et al.—"Describing Multimedia Content using Attention-based Encoder-Decoder Networks"—2015—https://arxiv.org/pdf/1507.01053.pdf (Year: 2015).*

(Continued)

*Primary Examiner* — Viker A Lamardo
(74) *Attorney, Agent, or Firm* — Fish & Richardson P.C.

(57) ABSTRACT

Methods, systems, and apparatus, including computer programs encoded on computer storage media, for generating output sequences from input sequences. One of the methods includes obtaining an input sequence having a first number of inputs arranged according to an input order; processing each input in the input sequence using an encoder recurrent neural network to generate a respective encoder hidden state for each input in the input sequence; and generating an output sequence having a second number of outputs arranged according to an output order, each output in the output sequence being selected from the inputs in the input sequence, comprising, for each position in the output order: generating a softmax output for the position using the encoder hidden states that is a pointer into the input sequence; and selecting an input from the input sequence as the output at the position using the softmax output.

20 Claims, 5 Drawing Sheets

(56) References Cited

U.S. PATENT DOCUMENTS 10,402,719 B1  9/2019  Vinyals et al.

OTHER PUBLICATIONS

Bahdanau et al.—"Neural Machine Translation By Jointly Learning To Align And Translate"—2015—https://arxiv.org/pdf/1409.0473v6.pdf (Year: 2015).*
Sukhbaatar et al.—"End-To-End Memory Networks"—2015—https://arxiv.org/pdf/1503.08895.pdf (Year: 2015).*
Mikolov et al.—"Learning Longer Memory in Recurrent Neural Networks"—2015—https://arxiv.org/pdf/1412.7753.pdf (Year: 2015).*
Chorowski et al.—"End-to-end Continuous Speech Recognition using Attention-based Recurrent NN: First Results"—2014—https://arxiv.org/pdf/1412.1602.pdf (Year: 2014).*
Zaremba et al.—"Recurrent Neural Network Regularization"—2014—https://arxiv.org/pdf/1409.2329v4.pdf (Year: 2014).*
Schrimpf et al.—"A Flexible Approach To Automated RNN Architecture Generation"—2017—https://arxiv.org/pdf/1712.07316.pdf (Year: 2017).*
Wang et al.—"Machine Comprehension Using Match-LSTM and Answer Pointer"—2016—https://arxiv.org/pdf/1608.07905.pdf (Year: 2016).*
Merity et al.—"Pointer Sentinel Mixture Models"—2016—https://arxiv.org/pdf/1609.07843.pdf (Year: 2016).*
Hu et al.—"Question Answering Using Match-LSTM and Answer Pointer"—2016—https://pdfs.semanticscholar.org/f9f0/8511f77c29ff948e146434dfb23608d3deb5.pdf?_ga=2.163597687.950043011.1554926261-1965269044.1548967211 (Year: 2016).*
Bandanau et al., "Neural machine translation by jointly learning to align and translate," In ICLR 2015, arXiv preprint arXiv:1409.0473, Sep. 2014, pp. 1-15.
Graves et al., "Neural taring machines," arXiv preprint arXiv:1410.5401v2 [cs.NE], Dec. 2014, pp. 1-26.
Hu et al., "Question Answeiing Using Match-LSTM and Answer Pointer" 2016 https://pdfs.sennanticscholar.org/f9f0/8511f77c29ff948e146434dfb23608d3deb5.pdf?_ga=2.163597687.950043011.1554926261-1965269044.1548967211 (Year: 2016).
Robinson, "An application of recurrent nets to phone probability estimation," Neural Networks, IEEE Transactions on, 5(2):298-305, Mar. 1994.
Rumelhart et al., Learning internal representations by error propagation, Technical report, DTIC Document, Sep. 1985, 45 pages.
Sukhbaatar et al., "End-To-End Memory Networks"—2015—https://arxiv.org/pdf/1503.013895.pdf (Year: 2015).
Sutskever et al., "Sequence to sequence learning with neural networks," In Advances in Neural Information Processing Systems, pp. 3104-3112, 2014.
Vinyals et al., "Grammar as a foreign language," arXiv preprint arXiv: 1412.7449, Dec. 2014, pp. 1-10.
Vinyals et al., "Pointer Networks," arXiv preprint arXiv:1506.03134v1 [stat.ML], Jun. 2015, pp. 1-9.
Weston et al., "Memory networks," In ICLEAR 2015, arXiv preprint arXiv:1410.3916, Nov. 2015, pp. 1-15.
Zarennba et al., "Recurrent Neural Network Regularization" 2014 https://arxiv.org/pdf/1409.2329v4.pdf (Year: 2014).

* cited by examiner

GENERATING OUTPUT SEQUENCES FROM INPUT SEQUENCES USING NEURAL NETWORKS

CROSS-REFERENCE TO RELATED APPLICATION

This is a continuation of U.S. application Ser. No. 15/076,426, filed on Mar. 21, 2016, the disclosure of which is considered part of and is incorporated by reference in the disclosure of this application.

BACKGROUND

This specification relates to generating output sequences from input sequences using neural networks.

Many data processing tasks involve converting an ordered sequence of inputs into an ordered sequence of outputs. For example, machine translation systems translate an input sequence of words in one language into a sequence of words in another language. As another example, pronunciation systems convert an input sequence of graphemes into a target sequence of phonemes. In these tasks, the outputs in the output sequence are selected from a fixed vocabulary of possible outputs, e.g., a vocabulary of words or a vocabulary of phonemes. In some other tasks, however, the number of possible outputs in the vocabulary depends on the length of the input sequence. For example, some tasks involve sorting the inputs in an input sequence to generate an output sequence that includes the inputs from the input sequence ordered according to some specified characteristic.

SUMMARY

This specification describes how a system implemented as computer programs on one or more computers in one or more locations can convert an input sequence into an output sequence that includes outputs that are selected from the inputs in the input sequence.

Particular embodiments of the subject matter described in this specification can be implemented so as to realize one or more of the following advantages. A neural network system can effectively generate an output that is a pointer into an input sequence, regardless of the number of inputs in the input sequence. Thus, an output sequence that consists of inputs from an input sequence can effectively be generated. Moreover, the neural network system can effectively generate such output sequences for input sequences of varying lengths.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
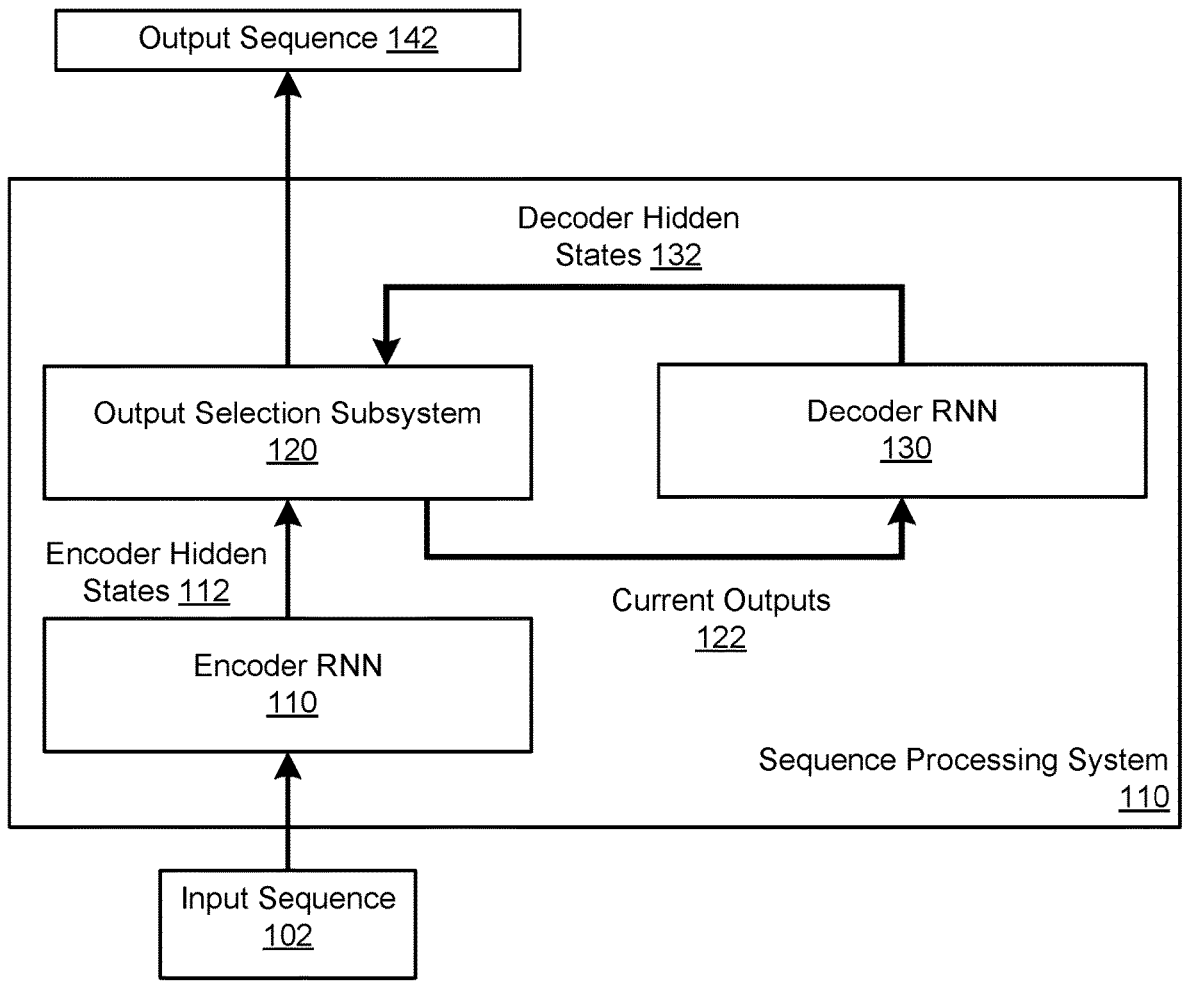
FIG. 1 shows an example sequence processing system.

FIG. 1 shows an example sequence processing system 100. The sequence processing system 100 is an example of a system implemented as computer programs on one or more computers in one or more locations, in which the systems, components, and techniques described below can be implemented.

The sequence processing system 100 receives input sequences and converts the input sequences to output sequences. In particular, for a given input sequence that includes multiple inputs arranged in an input order, e.g., an input sequence 102, the sequence processing system 100 generates an output sequence, e.g., an output sequence 142, that includes multiple outputs in an output order, with each output in the output sequence being selected from the inputs in the input sequence. That is, for each position in the output order, the sequence processing system 100 selects an input from the input sequence as the output at the position.

For example, the sequence processing system 100 may be configured to receive an input sequence and to sort the inputs in the input sequence according to a specified characteristic to generate the output sequence.

As another example, the sequence processing system 100 may be configured to receive an input sequence that contains inputs that are coordinates of points, e.g., Cartesian coordinates, and to generate an output sequence that represents the convex hull of the set of input points. The convex hull of a set of points is the smallest convex set that contains all of the points in the set.

As yet another example, the sequence processing system 100 may be configured to receive an input sequence that contains inputs that are coordinates of points and to generate an output sequence that represents the Delaunay triangulation of the set of input points, i.e., with the first three outputs in the output sequence being the vertices of one triangle, the second three outputs in the output sequence being the vertices of another triangle, and so on. A Delaunay triangulation of a set of points is a triangulation such that each circumcircle of every triangle in the triangulation is empty, i.e., that there are no points from the set in its interior.

As yet another example, the sequence processing system 100 may be configured to receive an input sequence that contains inputs that are coordinates of points and to generate an ordered output sequence that represents the most efficient, i.e., least total distance, Hamiltonian cycle through all of the points in the input sequence.

The sequence processing system 100 includes an encoder recurrent neural network (RNN) 110, an output selection subsystem 120, and a decoder RNN 130. Generally, the output selection subsystem 120 generates output sequences for input sequences from outputs generated by the encoder RNN 110 and the decoder RNN 130.

In particular, the output selection subsystem 120 processes the inputs in an input sequence using the encoder RNN 110 to generate a set of encoder hidden states that includes a respective encoder hidden state for each input in the input sequence, e.g., encoder hidden states 112 for the inputs in the input sequence 102.

The encoder RNN 110 is a recurrent neural network that has been configured, e.g., through training, to receive each input in a given input sequence beginning with the initial input in the input order and, for a given received input, to update the current hidden state of the encoder RNN 110 by processing the received input, i.e., to modify the current hidden state of the encoder RNN 110 that has been generated by processing previous inputs from the input sequence by processing the current received input. If the received input is the first input in the input order, the current hidden state is a pre-determined initial hidden state. The updated hidden state of the encoder RNN 110 after processing a given input will be referred to in this specification as the encoder hidden state for the given input.

In some implementations, the encoder RNN 110 is an LSTM neural network that includes one or more LSTM neural network layers, with each of the LSTM layers including one or more LSTM memory blocks. Each LSTM memory block can include one or more cells that each include an input gate, a forget gate, and an output gate that allow the cell to store previous activations generated by the cell, e.g., as a hidden state for use in generating a current activation or to be provided to other components of the LSTM neural network 110. An example LSTM neural network is described in more detail in "Generating sequences with recurrent neural networks," Alex Graves, available at http://arxiv.org/abs/1308.0850v5.

Once the encoder hidden states have been generated, the output selection subsystem 120 uses decoder hidden states, e.g., decoder hidden states 132, generated by the decoder RNN 130 to select an output for each position in the output order of the output sequence. In particular, for each position, the output selection subsystem 120 uses a decoder hidden state generated by the decoder RNN 130 and the encoder hidden states for the inputs in the input sequence to generate a softmax output for the position that is a pointer into the input sequence. That is, the softmax output includes a respective score for each position in the input order. The output selection subsystem 120 then selects the input at the highest-scoring position in the input order as the output at the position in the output order. Generating a softmax output is described in more detail below with reference to FIGS. 2-4.

The decoder RNN 130 is a recurrent neural network that has been configured, e.g., through training, to receive a current output, e.g., a current output 122, in an output sequence and to update the current hidden state of the decoder RNN 130 by processing the current output. That is, the decoder RNN 130 has been configured to modify the current hidden state of the encoder RNN 110 that has been generated by processing previous outputs from the output sequence by processing the current output from the output sequence. If the current output is the first output in the output sequence, the current hidden state of the decoder RNN 130 is a pre-determined initial hidden state, e.g., the final hidden state of the encoder RNN 110 or a fixed initial hidden state. The updated hidden state of the decoder RNN 130 after processing a given output from the output sequence will be referred to in this specification as the decoder hidden state for the given output. Like the encoder RNN 110, in some implementations, the decoder RNN is an LSTM neural network.

After the output selection system has selected an input for a given position in the output order, the output selection subsystem 120 then determines whether or not another output should be added to the output sequence after the current output. In particular, the output selection subsystem 120 determines not to add another output to the output sequence after the current output when the current output, i.e., the output selected by the output selection subsystem 120 for the current position in the output order, is a designated input, as will be described in more detail below with reference to FIG. 3.

Once the output selection subsystem 120 has determined not to add another output to the output sequence after a given output, the output selection subsystem 120 outputs the current output sequence as the final output sequence for the input sequence.

Generally, the input sequences received by the sequence processing system 100 and the output sequences generated by the sequence processing system 100 are variable-length sequences, i.e., sequences that can contain varying numbers of inputs and outputs, respectively. Additionally, the number of outputs in an output sequence generated by the sequence processing system 100 may be the same as or different from the number of inputs in the input sequence from which the output sequence was generated.

Figure 2:
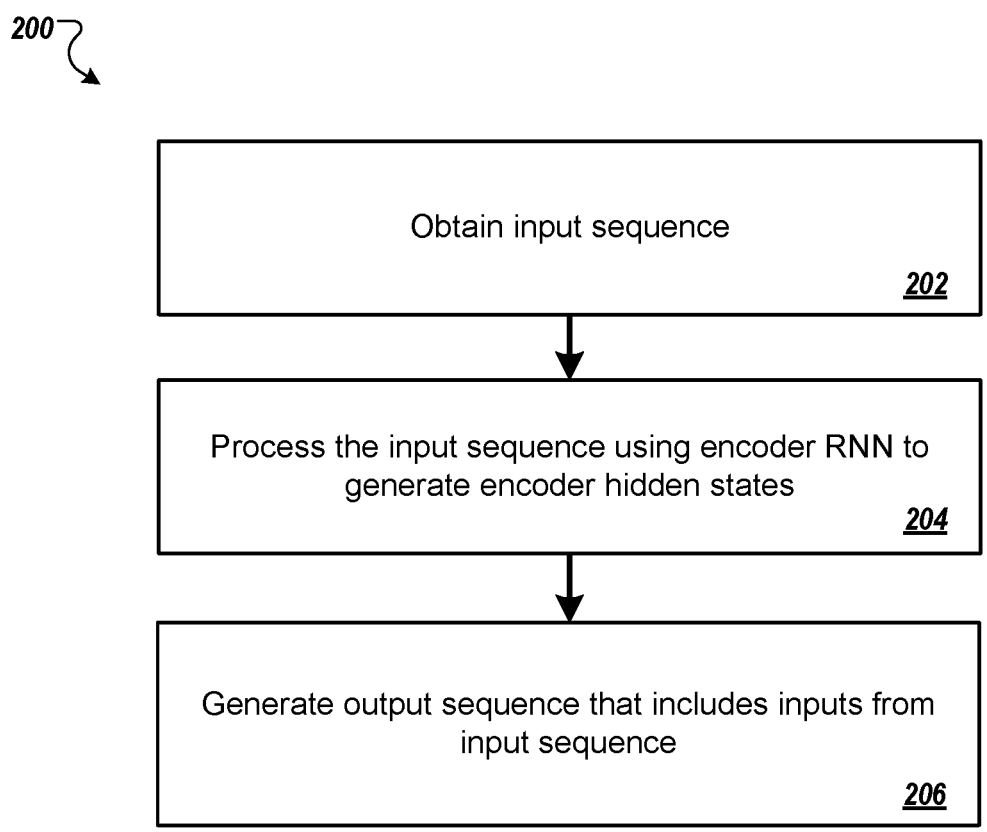
FIG. 2 is a flow diagram of an example process for generating an output sequence from an input sequence.

FIG. 2 is a flow diagram of an example process 200 for generating an output sequence from an input sequence. For convenience, the process 200 will be described as being performed by a system of one or more computers located in one or more locations. For example, a sequence processing system, e.g., the sequence processing system 100 of FIG. 1, appropriately programmed, can perform the process 200.

The system obtains an input sequence (step 202). The input sequence includes a set of inputs arranged according to an input order.

The system processes the input sequence using an encoder RNN, e.g., the encoder RNN 110 of FIG. 1, to generate a respective encoder hidden state for each input in the sequence (step 204). That is, for each input in the input sequence beginning with the initial input in the input order, the system processes the input in the sequence using the encoder RNN to update the current hidden state of the encoder RNN to generate an updated hidden state, i.e., the encoder hidden state for the input. For the initial input in the input order, the current hidden state is a pre-determined initial RNN hidden state.

In some implementations, the system augments the input sequence and the corresponding encoder hidden state to a designated token to the input sequence that has a corresponding fixed encoder hidden state. The designated token is a pre-determined input that is not in the vocabulary of possible inputs, i.e., are not possible inputs that might be included in an input sequence obtained by the system.

The system generates an output sequence that includes outputs arranged according to an output order using the encoder hidden states (step 206). For each position in the output order, the system uses the encoder hidden states to select one of the inputs in the input sequence as the output at the position. In particular, the system uses the encoder hidden states to generate a softmax output for the position that is a pointer into the inputs in the input sequence, i.e., that includes a respective score for each position in the input order. The system then selects an input from the input sequence as the output at the position using the softmax output, i.e., by selecting the input at the highest-scoring position in the input order. Generating the softmax output for a given position in the output order is described in more detail below with reference to FIGS. 3 and 4.

Figure 3:
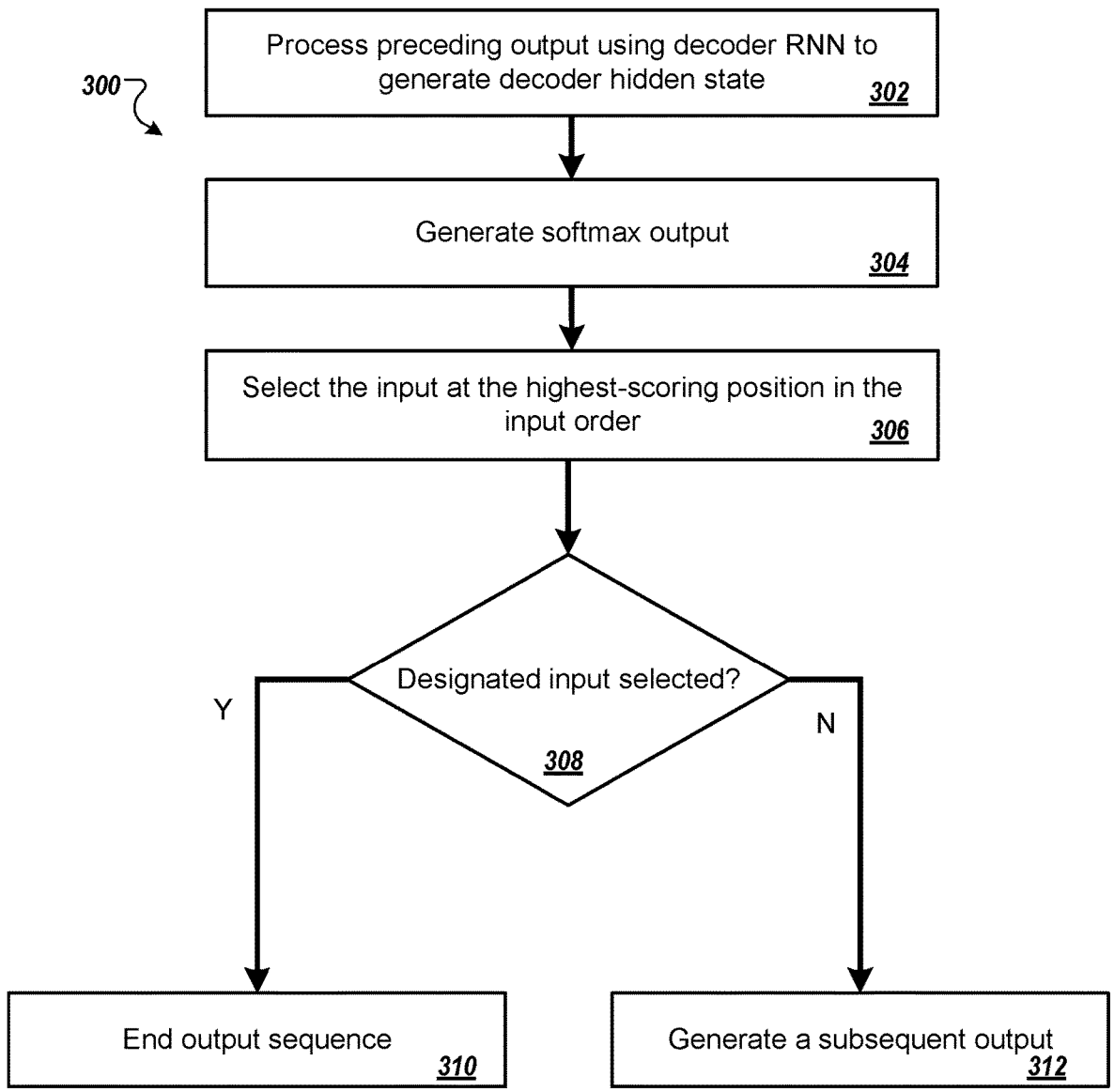
FIG. 3 is a flow diagram of an example process for generating an output for a given position in output order using a decoder RNN.

FIG. 3 is a flow diagram of an example process 300 for generating an output for a given position in output order using a decoder RNN. For convenience, the process 300 will be described as being performed by a system of one or more computers located in one or more locations. For example, a sequence processing system, e.g., the sequence processing system 100 of FIG. 1, appropriately programmed, can perform the process 300.

The system processes the preceding output, i.e., the output at the position immediately before the given position in the output order, using a decoder RNN, e.g., the decoder RNN 130 of FIG. 1, to update the current hidden state of the decoder RNN to generate an updated hidden state, i.e., the decoder hidden state for the preceding output (step 302). If the given position is the initial position in the output order, the system initializes the current hidden state of the decoder RNN to be the encoder hidden state for the last input in the input sequence. Additionally, if the given position is the initial position in the output order, the system processes a predetermined designated initial output using the decoder RNN rather than the preceding output.

The system generates a softmax output for the position from the decoder hidden state for the preceding output and the encoder hidden states for the inputs in the input sequence (step 304). As described above, the softmax output includes a respective score for each position in the input order. Generating the softmax output from the decoder hidden state and the encoder hidden states for the inputs in the input sequence is described below with reference to FIG. 4.

The system selects the input at the highest-scoring position in the input order as the output at the given position (step 306).

The system determines whether the input selected as being the output at the given position is the designated input that is not in the vocabulary of possible inputs, i.e., is not a possible input that might be included in an input sequence obtained by the system (step 308).

If the selected input is the designated input, the system ends the output sequence (step 310), i.e., determines that the given position should be the last position in the output order. The system can remove the designated input that was selected as the last output in the sequence from the sequence and output the sequence with the designated input removed as the final output sequence for the input sequence.

If the selected input is not the designated input, the system determines that a subsequent output should be added at the next position in the output order (step 310), i.e., the system determines to repeat the process 300 for the next position in the output order. Thus, the output sequences generated by the system may be variable length output sequences because the system only determines that the output sequence should be ended once the designated input has been selected.

Figure 4:
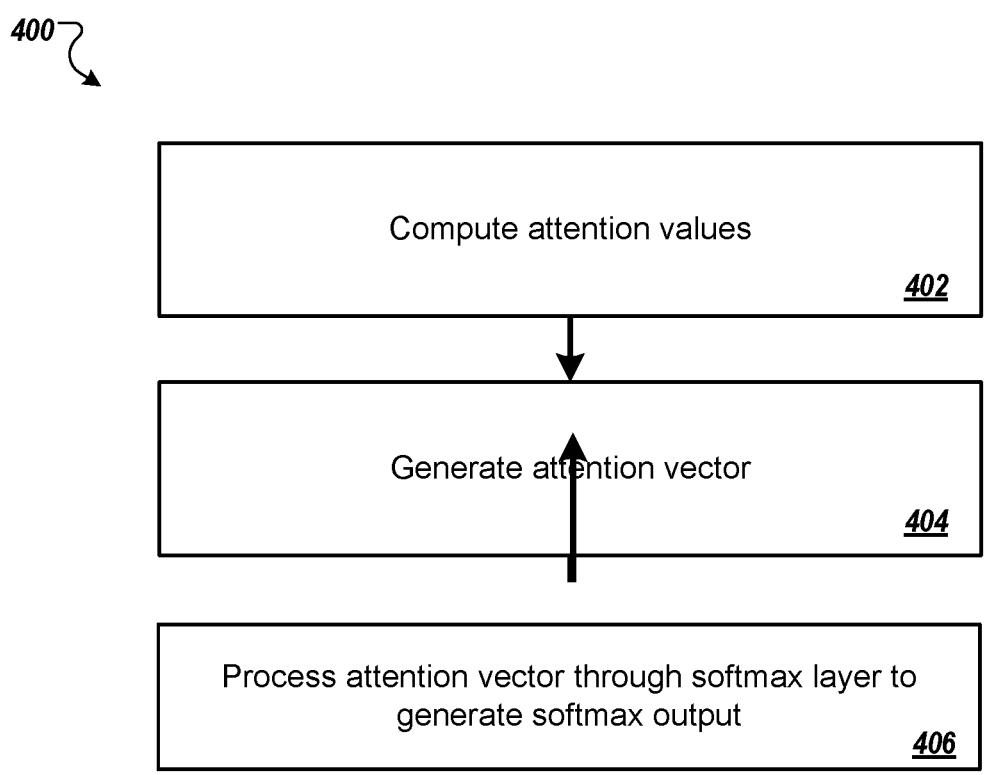
FIG. 4 is a flow diagram of an example process for generating a softmax output for a given position in an output sequence.

FIG. 4 is a flow diagram of an example process 400 for generating a softmax output for a given position in an output sequence. For convenience, the process 400 will be described as being performed by a system of one or more computers located in one or more locations. For example, a sequence processing system, e.g., the sequence processing system 100 of FIG. 1, appropriately programmed, can perform the process 400.

The system computes a respective attention value for each position in the input order (step 402). In particular, for each position in the input order, the system combines the encoder hidden state for the position in the input order and the decoder hidden state for the output at the position preceding the given position in the output order using a combining function to generate the attention value for the position in the input order. Thus, each attention value is generated using the decoder hidden state for the preceding output in the output order combined with a different encoder hidden state. In some implementations, the attention value $u_j^i$ for the j-th position in the input order generated for the i-th position in the output order satisfies:

$$u_j^i = u^T \tanh(W_1 e_j + W_2 d_i),$$

where $e_j$ is the encoder hidden state for the j-th position in the input order, $d_i$ is the decoder hidden state for output at the position preceding the i-th position in the output order, and VT, $W_1$, and $W_2$ are parameters of the combining function.

The system generates an attention vector for the given position in the output order from the attention values (step 404). That is, the system generates a vector that includes a respective attention value at each position in the vector arranged so that the values begin with the attention value for the initial position in the input order and end with the attention value for the last position in the input order.

The system processes the attention vector through a softmax neural network layer to generate a softmax output for the given position in the output order (step 406). The softmax neural network layer is configured to receive an attention vector and to process the attention vector generate a softmax output that includes a respective score for each position in the input order.

In some implementations, the system generates multiple possible output sequences and determines a respective sequence score for each possible output sequence. The system can then select the possible output sequence having the highest sequence score as the output sequence. In particular, the system can generate the multiple possible output sequences by performing a beam search decoding using the decoder RNN.

Figure 5:
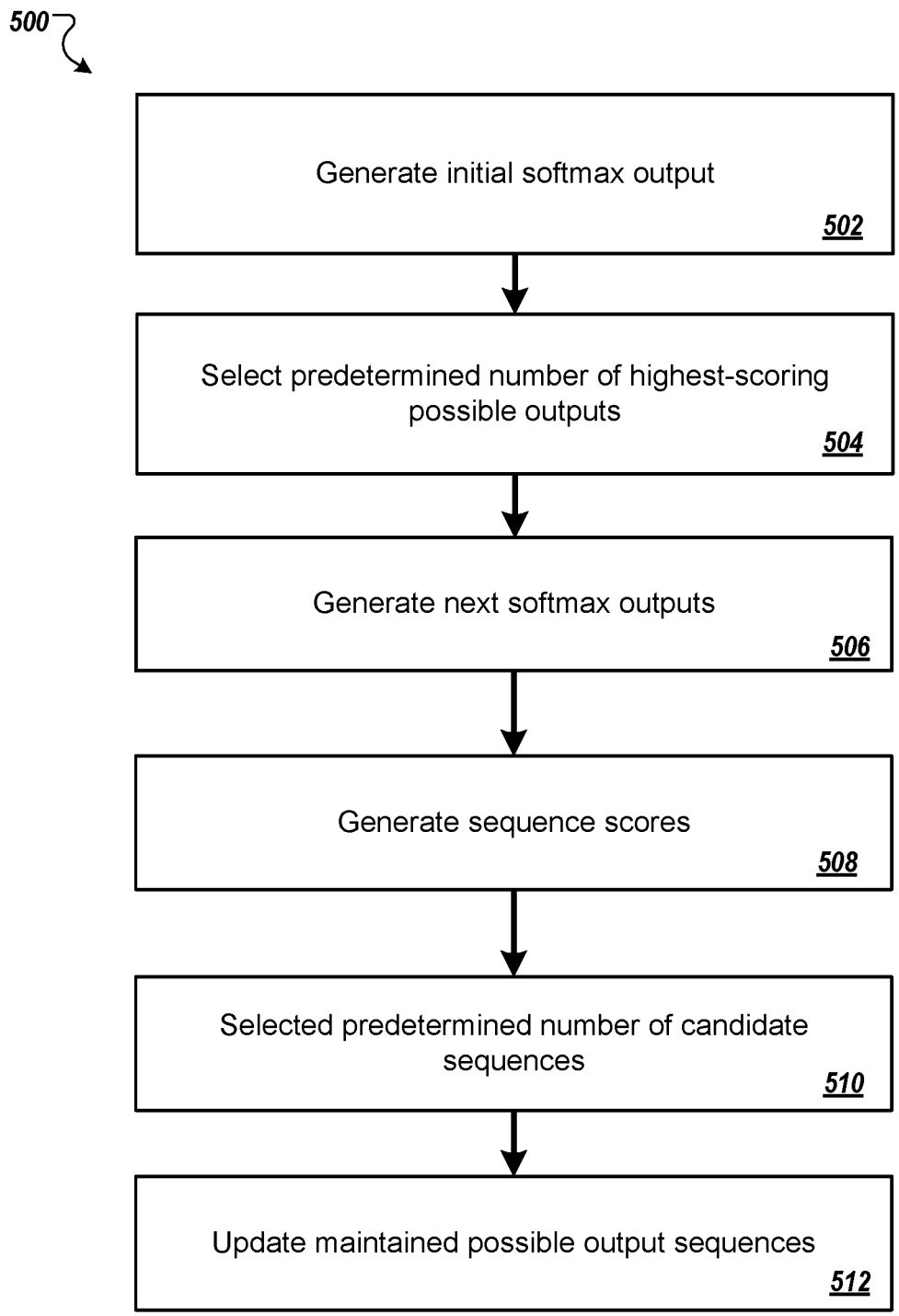
FIG. 5 is a flow diagram of an example process for performing a beam search decoding using a decoder RNN.

FIG. 5 is a flow diagram of an example process 500 for performing a beam search decoding using a decoder RNN. For convenience, the process 500 will be described as being performed by a system of one or more computers located in one or more locations. For example, a sequence processing system, e.g., the sequence processing system 100 of FIG. 1, appropriately programmed, can perform the process 500.

The system generates an initial softmax output for the initial position in the output order (step 502), e.g., as described above with reference to FIGS. 3-5.

The system selects a predetermined number of highest-scoring possible outputs according to the softmax output (step 504). The system generates a respective possible output sequence for each selected possible output, each possible output sequence including the corresponding selected possible output at the initial position in the output order. The system associates the possible output sequence with the score for the corresponding possible output in the softmax output as the sequence score for the possible output sequence.

The system generates a respective next softmax output for each maintained possible output sequence for the current position in the output order (step 506).

That is, for each maintained possible output sequence, the system processes the current output in the possible output sequence using the decoder RNN to generate a decoder hidden state and then generates a next softmax output for the possible output sequence from the encoder hidden states and the decoder hidden state as described above.

The system processes each maintained possible output sequence independently from each other maintained possible output sequence, so that the decoder hidden state used to generate the softmax output for the current output in a given possible output sequence is based only on the processing of the possible output sequence and not on the selected outputs for any other possible output sequence.

For example, once the system has selected the possible outputs for the initial position in the output order, the system can process each of the selected initial position outputs using the decoder RNN to generate a respective decoder hidden state and then generate a respective second softmax output from each decoder hidden state.

The system generates, for each maintained possible output sequence, a respective sequence score for each possible candidate output sequence that can be generated from the possible output sequence (step 508). A candidate output sequence for a given possible output sequence is a sequence that appends one of the possible outputs to the end of the possible output sequence. The sequence score for the candidate output sequence is the sequence score for the possible output sequence multiplied by the softmax score for the appended possible output.

The system selects the predetermined number of candidate output sequences that have the highest sequence scores (step 510).

The system updates the maintained possible output sequences to be the selected candidate output sequences (step 512).

When a selected candidate output sequence ends with the designated token, the system removes the selected candidate output sequence from the beam, i.e., stops adding additional outputs to the selected candidate output sequence, and considers the selected candidate output sequence prior to the designated token being added to be a final possible output sequence. The system also reduces the predetermined number of sequences to be maintained by one.

The system can repeat steps 506-512 of the process 500 until each maintained possible output sequence has been finalized. The system can then select the final possible output sequence having the highest sequence score as the output sequence for the input sequence or can provide multiple ones of the final possible output sequences as possible output sequences for the input sequence.

In order to configure the encoder RNN, the decoder RNN, and the combining function, the system can train the networks using conventional machine learning training techniques, e.g., using Stochastic Gradient Descent. In particular, the system can train the networks jointly by backpropagating gradients computed for the softmax output layer back to the combining function, the decoder RNN, and the encoder RNN to adjust the values of the parameters of the softmax output layer, the combining function, the encoder RNN, and the decoder RNN for each iteration of the training technique.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   obtaining an input sequence having a first number of inputs arranged according to an input order;
   processing each input in the input sequence using an encoder recurrent neural network to generate a respective encoder hidden state for each input in the input sequence; and
   generating an output sequence having a second number of outputs arranged according to an output order, each output in the output sequence being selected from the inputs in the input sequence, comprising, for each position in the output order and beginning at an initial position in the output order:
   generating a softmax output for the position using the encoder hidden states that is a pointer into the input sequence; and
   selecting an input from the input sequence as the output at the position using the softmax output.

2. The method of claim 1, wherein generating the softmax output for the position comprises, for the initial position in the output order:
   processing a predetermined initial output using a decoder recurrent neural network to generate an initial decoder hidden state;
   generating, from the initial decoder hidden state and the hidden states for the inputs in the input sequence, the softmax output for the initial position, wherein the softmax output comprises a respective output score for each position in the input order; and
   selecting an input at the highest-scoring position in the input order according to the output scores as the output at the initial position in the output order.

3. The method of claim 2, wherein processing the predetermined initial output using the decoder recurrent neural network to generate an initial decoder hidden state comprises:
   initializing an internal state of the decoder recurrent neural network to the encoder hidden state for the last input in the input sequence; and
   processing the predetermined initial output using the decoder recurrent neural network to update the initialized internal state to the initial decoder hidden state.

4. The method of claim 1, wherein generating the softmax output for the position comprises, for each position after the initial position in the output order:
   processing an output at the preceding position in the output order using a decoder recurrent neural network to generate a decoder hidden state for the output at the preceding position;
   generating, from the decoder hidden state for the output at the preceding position and the hidden states for the inputs in the input sequence, the softmax output for the position, wherein the softmax output comprises a respective output score for each position in the input order; and selecting an input at the highest-scoring position in the input order according to the output scores as the output at the position in the output order.

5. The method of claim 4, wherein generating the softmax output for the position comprises:

generating an attention vector having a dimensionality equal to the first number of inputs in the input sequence, comprising, for each position in the input order:

combining the encoder hidden state for the input at the position in the input order and the decoder hidden state for the output at the preceding position in the output order to generate a value at a corresponding position in the vector; and generating the respective output scores by processing the attention vector through a softmax output layer.

6. The method of claim 1, further comprising, for each position in the output order:

determining whether or not the selected output at the position is a designated input;

when the selected output at the position is not the designated input, determining that an output should be generated for a subsequent position in the output order; and when the selected output at the position is the designated input, determining that the position is the last position in the output order.

7. The method of claim 1, further comprising:

generating one or more additional output sequences using a beam search technique;

determining a respective sequence score for the output sequence and for each additional output sequence; and selecting an output sequence having a highest sequence score as a final output sequence for the input sequence.

8. The method of claim 1, wherein:

obtaining the input sequence comprises obtaining respective coordinates of the first number of input points; and generating the output sequence comprises generating a corresponding solution to a geometric problem with respect to the input points.

9. The method of claim 8, wherein the geometric problem is a convex hull problem, a Delaunay triangulation problem, or a Travelling Salesman Problem.

10. A system comprising one or more computers and one or more storage devices storing instructions that when executed by the one or more computers cause the one or more computers to perform operations comprising:

obtaining an input sequence having a first number of inputs arranged according to an input order;

processing each input in the input sequence using an encoder recurrent neural network to generate a respective encoder hidden state for each input in the input sequence; and generating an output sequence having a second number of outputs arranged according to an output order, each output in the output sequence being selected from the inputs in the input sequence, comprising, for each position in the output order and beginning at an initial position in the output order:

generating a softmax output for the position using the encoder hidden states that is a pointer into the input sequence; and selecting an input from the input sequence as the output at the position using the softmax output.

11. The system of claim 10, wherein generating the softmax output for the position comprises, for the initial position in the output order:

processing a predetermined initial output using a decoder recurrent neural network to generate an initial decoder hidden state;

generating, from the initial decoder hidden state and the hidden states for the inputs in the input sequence, the softmax output for the initial position, wherein the softmax output comprises a respective output score for each position in the input order; and selecting an input at the highest-scoring position in the input order according to the output scores as the output at the initial position in the output order.

12. The system of claim 11, wherein processing the predetermined initial output using the decoder recurrent neural network to generate an initial decoder hidden state comprises:

initializing an internal state of the decoder recurrent neural network to the encoder hidden state for the last input in the input sequence; and processing the predetermined initial output using the decoder recurrent neural network to update the initialized internal state to the initial decoder hidden state.

13. The system of claim 10, wherein generating the softmax output for the position comprises, for each position after the initial position in the output order:

processing an output at the preceding position in the output order using a decoder recurrent neural network to generate a decoder hidden state for the output at the preceding position;

generating, from the decoder hidden state for the output at the preceding position and the hidden states for the inputs in the input sequence, the softmax output for the position, wherein the softmax output comprises a respective output score for each position in the input order; and selecting an input at the highest-scoring position in the input order according to the output scores as the output at the position in the output order.

14. The system of claim 13, wherein generating the softmax output for the position comprises:

generating an attention vector having a dimensionality equal to the first number of inputs in the input sequence, comprising, for each position in the input order:

combining the encoder hidden state for the input at the position in the input order and the decoder hidden state for the output at the preceding position in the output order to generate a value at a corresponding position in the vector; and generating the respective output scores by processing the attention vector through a softmax output layer.

15. The system of claim 10, the operations further comprising, for each position in the output order:

determining whether or not the selected output at the position is a designated input;

when the selected output at the position is not the designated input, determining that an output should be generated for a subsequent position in the output order; and when the selected output at the position is the designated input, determining that the position is the last position in the output order.

16. The system of claim 10, the operations further comprising:
- generating one or more additional output sequences using a beam search technique;
- determining a respective sequence score for the output sequence and for each additional output sequence; and
- selecting an output sequence having a highest sequence score as a final output sequence for the input sequence.

17. One or more non-transitory computer storage media storing instructions that when executed by one or more computers cause the one or more computers to perform operations comprising:
- obtaining an input sequence having a first number of inputs arranged according to an input order;
- processing each input in the input sequence using an encoder recurrent neural network to generate a respective encoder hidden state for each input in the input sequence; and
- generating an output sequence having a second number of outputs arranged according to an output order, each output in the output sequence being selected from the inputs in the input sequence, comprising, for each position in the output order and beginning at an initial position in the output order:
  - generating a softmax output for the position using the encoder hidden states that is a pointer into the input sequence; and
  - selecting an input from the input sequence as the output at the position using the softmax output.

18. The computer storage media of claim 17, wherein generating the softmax output for the position comprises, for the initial position in the output order:
- processing a predetermined initial output using a decoder recurrent neural network to generate an initial decoder hidden state;
- generating, from the initial decoder hidden state and the hidden states for the inputs in the input sequence, the softmax output for the initial position, wherein the softmax output comprises a respective output score for each position in the input order; and
- selecting an input at the highest-scoring position in the input order according to the output scores as the output at the initial position in the output order.

19. The computer storage media of claim 18, wherein processing the predetermined initial output using the decoder recurrent neural network to generate an initial decoder hidden state comprises:
- initializing an internal state of the decoder recurrent neural network to the encoder hidden state for the last input in the input sequence; and
- processing the predetermined initial output using the decoder recurrent neural network to update the initialized internal state to the initial decoder hidden state.

20. The computer storage media of claim 17, the operations further comprising, for each position in the output order:
- determining whether or not the selected output at the position is a designated input;
- when the selected output at the position is not the designated input, determining that an output should be generated for a subsequent position in the output order; and
- when the selected output at the position is the designated input, determining that the position is the last position in the output order.

* * * * *